Patented Jan. 11, 1938

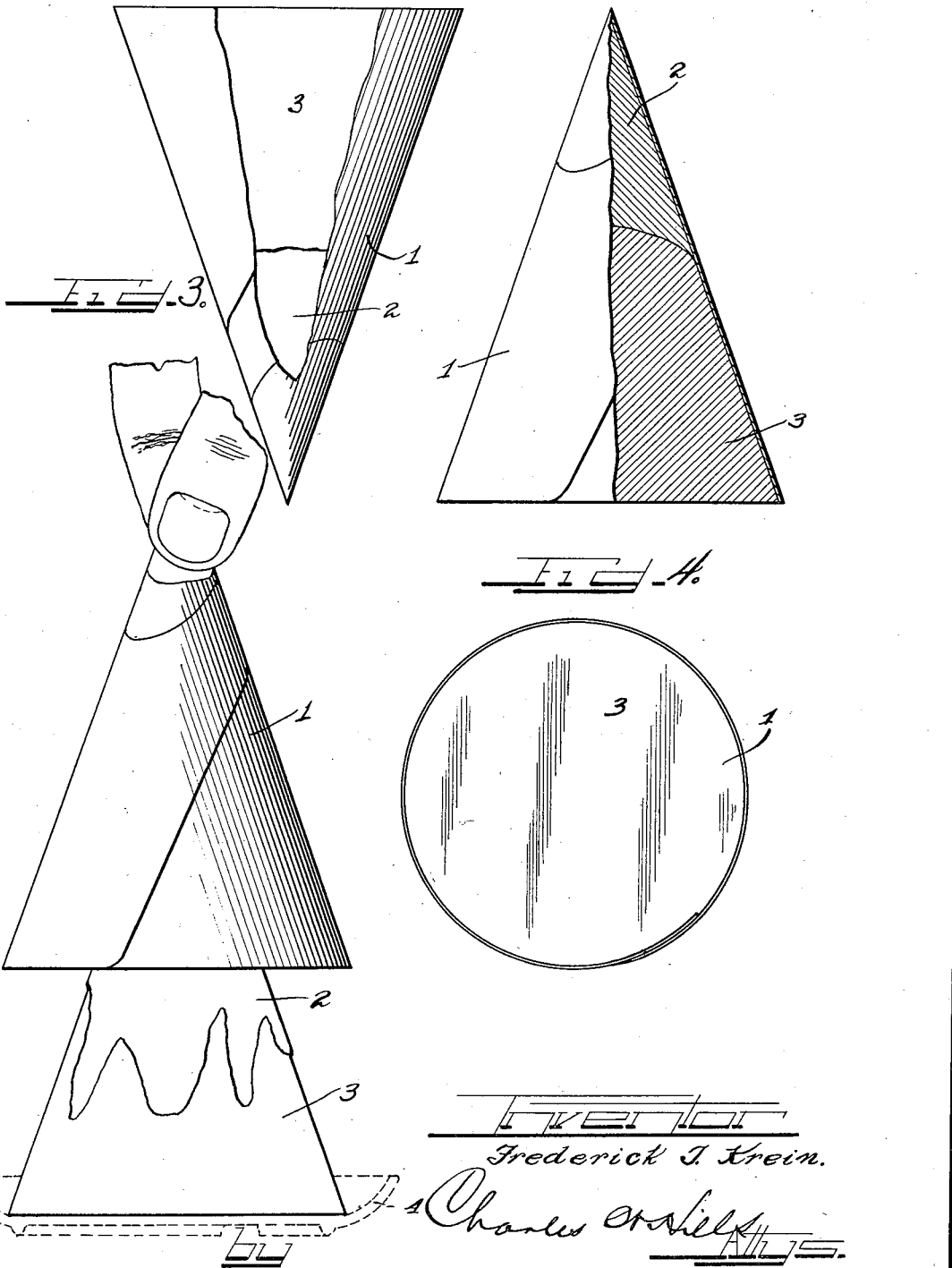

2,104,805

UNITED STATES PATENT OFFICE 2,104,805

SUNDAE PACKAGE

Frederick T. Krein, Park Ridge, Ill., assignor to Dixie-Vortex Company, a corporation of Delaware Application October 9, 1933, Serial No. 692,718

2 Claims. (Cl. 99—137)

The present invention relates to a sundae package and method of preparing the same and has to do with a method of packaging a sundae which is packaged at a factory with the sundae ingredients in a container, the container being maintained in refrigerating atmosphere until sold for consumption. The sundae so packaged is ejected from the container by applying pressure to the bottom of the container, thus ejecting the ingredients in such manner that the sundae syrup, crushed fruits, or the like flows over the ice cream or other solid ingredient of the sundae, ready to be eaten.

Ordinarily, sundaes are served at soda fountains, restaurants and the like by scooping a bit of ice cream from bulk ice cream, then pouring suitable syrup or other flavoring matter over the ice cream. When ice cream is applied in bulk, it has been found that successive spoon-fuls or scoop-fuls of ice cream removed from the bulk container reduce the content sometimes as much as 30%, in volume, thus causing a loss to the retailer.

Furthermore, it is at present impossible to purchase a sundae at a soda fountain and take it home for consumption there.

The present invention is directed to a packaged sundae, and method of making the same whereby the sundae ingredients are inserted in a container, at an ice cream factory, which container is then subjected to refrigeration to solidify the ice cream, and then the package is distributed to the soda fountain where again it is maintained in refrigerating atmosphere until sold for consumption. The purchaser may eat the sundae at the soda fountain or take it home. The sundae is ejected from the package by inverting the package over a dish and applying pressure to the closed end of the container whereby the ice cream is ejected and the sauce or syrup flows over the ice cream thus providing a very convenient and expeditious way of serving a sundae for home use or for counter use at a soda fountain.

Buying sundaes in the manner contemplated by the present invention eliminates the loss by volume attendant on dispensing scoop-fuls of ice cream from a bulk so that the retailer is enabled to sell all of the ice cream, by weight, which he purchases.

An object of the present invention has to do with a novel method of vending sundaes in packages.

Another object of the invention seeks to provide a method of vending sundaes whereby no ice cream loss results, as it does when sundaes are made from bulk ice cream.

A further object of the invention is to provide a packaged sundae.

A still further object of the invention is to provide a novel method of packaging ice cream and a sauce or syrup or crushed fruits and the like to provide a sundae which may be eaten anywhere and which may be ejected from the package simply by pressure applied to the closed end of the package.

The above, other and further objects of the invention will be apparent from the following description, accompanying drawing, and appended claims.

The accompanying drawing illustrates various aspects of the present invention and shows a sundae packaged in a conical cup, although, of course, the shape of the cup may be other than conical if so desired.

The views in the drawing are as follows:

Figure 1 is a side elevational view, with a part of the cup broken away, illustrating a packaged sundae made in accordance with the principles of the present invention.

Figure 2 is an elevational view, partially in section, showing the package of Figure 1 inverted and illustrating the relationship between the syrup or sauce and the solidifed ice cream.

Figure 3 is an elevational view of the illustrated conical cup showing the manner of ejecting the sundae from a container or cup, in accordance with the principles of the present invention.

Figure 4 is a plan view of the open end of the container showing it filled with ice cream or other suitable substance.

The drawing will now be explained.

The container or cup here illustrated, is illustrated as a conical cup, but it is to be understood that any suitable container or cup, of other shape, may be utilized. Preferably, it is desirable that the cup possess some taper for ready ejection of the sundae when pressure is applied to the closed end of the cup or container.

A container 1 is supported in upright position, that is, with its open end upwardly, and a measured or predetermined quantity of syrup, sauce, fruit juices, crushed fruit or the like is put in the container, as designated at 2. The balance of the container is then filled with ice cream mix 3 to the brim of the container and then the container is subjected to hardening or refrigeration to solidify the ice cream.

A plurality of containers so filled with sundae constituents may then be distributed to the retailer, such as a soda fountain proprietor, restaurant proprietor, or other merchant, where such merchant places the filled sundae containers in refrigerating atmosphere to maintain the ice cream in substantially solid state until a sale is made.

When a customer desires a sundae, he is supplied with a filled sundae container, of the present invention, and when he is ready to eat the sundae, he inverts the container and applies pressure to the closed end of the container, for instance, as squeezing the apex of the conical container as illustrated in Fig. 3, whereupon the ice cream is ejected and the flavoring syrup or sauce flows downwardly over the ice cream which is discharged onto a suitable dish 4.

While the substance of the sundae has herein been described as ice cream, it is to be understood that any suitable or edible substance of like characteristics or similar characteristics may be utilized. Such edible substances are usually of such character as to be fluid or soft at normal temperatures and which become substantially solid on congelation or refrigeration. Flavoring syrup or sauce generally does not solidify under refrigeration, but sometimes may become hard, depending, of course, on what the sauce or syrup is. It has been found that the usual sundae sauces do not become so hard or stiff as not to readily flow when the ice cream is ejected from a container in the manner heretofore described.

The ice cream mix is frothy in texture, which is due to presence of air in the mix. The mix, in bulk ice cream, is packed in a container and hardened which hardened ice cream still retains its frothy texture.

As a retailer removes the ice cream in spoonfuls or scoop-fuls from the bulk container, he presses down some of the ice cream in the container, thus expelling air from the bulk ice cream, and thus reduces its volume, so that in the end the retailer of bulk ice cream dispenses less ice cream in bulk than he purchases, causing a financial loss to the retailer.

The sundae made in accordance with the present invention eliminates this loss due to reduction in volume, by reason of the fact that the cups or containers are packed at the ice cream factory and no volume reduction follows as the sundaes are eaten as dispensed from the containers.

It will be observed that the present invention provides sundaes, or as a matter of fact, the present invention may be utilized for dispensing ice cream or similar edible substances without the syrup, if desired, and packaging such confection in such manner that the package contents may be readily ejected by pressure applied to the closed end of the container or cup.

While the cups or containers may be made of any suitable material, preferably the cups are made of such material as parchment or thin paper, and preferably coated with wax or like substances so as to be moistureproof and discourage excessive absorption of the contents.

The term "ice cream mix" as herein used, is used generically and not by way of limitation. The "mix" contemplates the materials from which the ice cream, or similar substances, is made.

The "mix" is usually subjected to refrigeration or freezing action, to produce a soft or semi-solid paste, for packaging, and then after packaging, the filled package or cups are subjected to refrigeration or freezing to harden the ice cream.

The invention has been described herein more or less precisely as to details, yet it is to be understood that the invention is not limited thereby, as changes may be made, and equivalents may be substituted without departing from the spirit and scope of the invention.

The invention is claimed as follows:

1. A packaged confectionery product, including in combination, a conical-like cup having walls sloping inwardly from the mouth thereof, the end of said cup opposite said mouth being closed, a flavoring medium in said cup adjacent the closed end, and a hardened confectionery mass on top of said flavoring medium filling said cup, said confectionery mass being molded by said cup into similar shape as said container, whereby when said cup and its contents are inverted and the closed tip of said cup is squeezed said mass will be discharged with said flavoring medium on top thereof in position to gravitate over the sloping walls of said mass to form a sundae.

2. A packaged confectionery product, including in combination, a one-piece cup of substantially true conical shape closed at the apex end and open at the larger end, a flavoring medium in said cup adjacent the closed end, and a hardened confectionery mass on top of said flavoring medium, said confectionery mass being molded by the cup into similar shape as the cup, and the apexial region of the cup being made of flexible material of such character that the cup may be subjected to a progressive squeezing from the apex towards the mouth to provide a progressively increasing discharging pressure to expel the contents.

FREDERICK T. KREIN.